United States Patent [19]

Hagiwara et al.

[11] 4,259,299
[45] Mar. 31, 1981

[54] PROCESS FOR REMOVING OZONE FROM AN OZONE-CONTAINING GAS

[75] Inventors: Zenzi Hagiwara, Kusatsu; Iwao Uenoyama, Izumi; Hiroo Ishino, Kusatsu, all of Japan

[73] Assignee: Osaka Oxygen Ind Ltd., Osaka, Japan

[21] Appl. No.: 24,198

[22] Filed: Mar. 27, 1979

[30] Foreign Application Priority Data

Sep. 29, 1978 [JP] Japan .................. 53-120235

[51] Int. Cl.³ .............................................. B01D 53/36
[52] U.S. Cl. .................................... 423/210; 55/68; 55/75; 252/455 Z; 252/446
[58] Field of Search ............ 423/210; 55/68, 75; 252/446, 455 Z

[56] References Cited

U.S. PATENT DOCUMENTS

| 2,980,494 | 4/1961 | Jenkins et al. ............ 423/210 S |
| 3,025,233 | 3/1962 | Figert .......................... 55/75 X |
| 3,219,590 | 11/1965 | Ribaud ........................ 252/446 |
| 3,407,617 | 10/1968 | Wischmeyer et al. ...... 252/446 |
| 3,516,783 | 6/1970 | Blanchard ................ 423/210 S |

FOREIGN PATENT DOCUMENTS 592728  2/1960  Canada ........................ 252/446

Primary Examiner—Earl C. Thomas
Attorney, Agent, or Firm—Browdy and Neimark

[57] ABSTRACT

A process for removing ozone from an ozone-containing gas which comprises treating the gas with a molded product obtained by the following steps, (a) wet-blending powdery or particulate activated carbon and zeolite in the presence of an organic binder and/or an inorganic binder,
(b) molding the resulting blend,
(c) drying the molded product, and
(d) calcining the molded product at a temperature at which the network structure of the zeolite is not broken is disclosed.

6 Claims, 5 Drawing Figures

PROCESS FOR REMOVING OZONE FROM AN OZONE-CONTAINING GAS

BACKGROUND OF THE INVENTION

This invention relates to a process for removing ozone from an ozone-containing gas which comprises treating the gas with a calcined molding product composed of activated carbon-zeolite mixture.

Ozone is a gas which has a strong oxidative action. So, ozone is widely used in oxidizing step for removing noxious material and smell component, and in decoloring. Ozone is also used in tertiary treatment of wastes. However, since ozone is noxious to a living body, it is necessary to make ozone-containing waste gas innoxious after use of ozone. When an ozone-containing waste gas is directly discharged into the atmosphere, oxidant generated through photochemical reaction acts to cause secondary environmental pollution. So, it is necessary to remove ozone from an ozone-containing waste gas from the view point of preventation of environmental pollution, until the ozone content of the gas is below the upper limit by government regulations.

Numerous attempts have been made to decompose ozone present in an ozone-containing waste gas. The following prior art processes have been carried out:

(a) a process for decomposing the ozone through heat or light, (b) a process for decomposing the ozone through chemical reaction using a reductant, such as potassium iodide, and (c) a process for decomposing the ozone using a catalyst.

The conventional process for decomposing ozone uses activated carbon as a catalyst. Processes for decomposing ozone using a metal compound-carrying activated carbon, and using graphite or carbon black in place of activated carbon have been attempted. Also combinations of (c) and (a), or (c) and (b) of the above processes have been attempted.

In the process for decomposing ozone using a catalyst, the following chemical reaction occur:

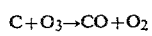  (i)

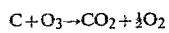  (ii)

In the prior process for decomposing ozone using activated carbon, activated carbon is converted to carbon monoxide and carbon dioxide. When the above reactions (i) and (ii) are carried out, the temperature of the catalyst bed is raised through heat of the reaction. This is undesirable. For example, when waste gas having a high ozone content is treated with only an activated carbon bed, the above chemical reactions proceed vigorously, whereby the temperature of the catalyst bed is rapidly raised. Therefore, the catalyst bed catches fire, and in the worst case, explosion of the bed may occur.

When activated carbon is used for decomposing ozone, the activated carbon is formed into pellet shape, tablet shape or particulate shape, and the molded activated carbon is charged into a column. However, in this case, according as the use of the molded activated carbon is continued, the activated carbon is gradually consumed whereby the mass becomes smaller one. Therefore, it is made difficult to pass an ozone-containing gas through the activated carbon bed.

SUMMARY OF THE INVENTION

An object of this invention is to provide a process for removing ozone from an ozone-containing gas using the calcinated molded shape composed of activated carbon-zeolite mixture.

Therefore, this invention relates to a process for producing a calcined molded product composed of activated carbon-zeolite mixture (sometimes hereinunder referred to as decomposition catalyst) which comprises the steps of (a) wet-blending powdery or particulate activated carbon and zeolite in the presence of an organic binder and/or an inorganic binder, (b) molding the resulting blend, (c) drying the molding, and (d) calcining the molded product at a temperature at which the network structure of the zeolite is not broken.

This invention also relates to a process for removing ozone from an ozone-containing gas which comprises treating the gas with a calcined molding composed of activated carbon-zeolite mixture, (a) wet-blending powdery or particulate activated carbon and zeolite in the presence of an organic binder and/or an inorganic binder, (b) molding the resulting blend, (c) drying the molding, and (d) calcining the molding at a temperature at which network structure of zeolite is not broken.

DETAILED DESCRIPTION OF THE INVENTION

Figure 1:
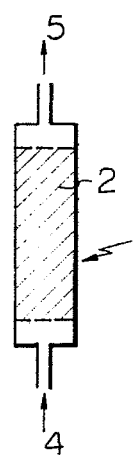
FIGS. 1 to 3 show a cross-sectional view of adsorption bed for treating an ozone-containing gas, into a calcined molded shape composed of activated carbon and zeolite is charged.

The zeolite employed in this invention is aluminosilicate having three dimensional structure and is represented by the formula:

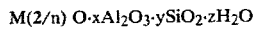

wherein M is mono- or di-valent cation; n is valence of the cation and x, y and z are coefficient or a metal-substituted aluminosilicate. The zeolite may include natural zeolite and synthetic zeolite. These zeolites are porous and have numerous pores. So, the zeolite has large surface/volume ratio (hereinunder referred to specific surface). For example, mordenite has a specific surface in the range of 300 to 400 m²/gr. A-type zeolite has a specific surface in the range of 400 to 500 m²/gr. X-type zeolite has a specific surface of 500 to 600 m²/gr. The above zeolites all have sieving action. Therefore, the zeolites are suitable for decomposing ozone. Examples of the natural zeolites include mordenite, clinoptilolite, chabazite, erionite, faujasite and the like. Examples of the synthetic zeolite include A-type zeolite, such as molecular sieves 4A and 5A; X-type zeolite, such as molecular sieve 13X; Y-type zeolite; mordenite, such as Zeolon 100-Na and the like. The zeolite may be substituted by a metal.

Activated carbons obtained from coal or palm husk and activated carbon obtained as a by-product in petroleum chemistry are preferred as the activated carbons to be employed in this invention, because these activated carbons have a large specific surface, and both micro and macro pores. Shirasagi-type activated carbon sold by Takeda Chemical Industries Ltd. and activated carbon sold by Tsurumi Coal Co. and Calgon Corporation are usable as activated carbon. The commercially available activated carbons have specific surface of more than 1000 $m^2/gr.$ and a pore volume of more than 0.6 ml/gr. Since the activated carbon obtained from palm husk has a specific surface of more than 1000 $m^2/gr.$ and a pore volume of more than 0.9 ml/gr., it is the first choice.

The ozone decomposing ability of zeolite is low, so a large amount of zeolite is required for making an ozone-containing gas innoxious. However, an activated carbon-zeolite mixture has synergistic effect, and a calcined molded shape using both components has excellent ability for decomposing ozone.

Typical Examples of organic binders that may be employed in this invention include acrylamide, saccarides, lignin and the like. Typical examples of inorganic binders that may be employed in this invention include urea and clay minerals, such as kaolin, bentonite and acid clay. The binder alone and mixtures of the binders may be used. The binder may be added to the activated carbon-zeolite mixture during wet-blending thereof. The use of the binders makes the molding operation easy and smooth, and the binder reinforces the bonding between the components particles constituting the calcined molded shape.

The ratio of activated carbon (c) to zeolite (z) is within the range of 0.2 to 9.0, the catalyst activity is enhanced and the life of the catalyst is prolonged. In addition, when the ratio of activated carbon to zeolite is within the range of 0.2 to 9.0, wet-blending of activated carbon to zeolite using the binder can be smoothly carried out and a catalyst in which zeolite and activated carbon is uniformly dispersed can be obtained. When an ozone-containing gas having high ozone content is treated with the catalyst, the ratio of C to Z in the catalyst is low, for example is within the range of 0.2 to 1.5. When the gas having high ozone content is treated with the decomposition catalyst, the reaction of carbon with ozone occurs vigorously as mentioned above, whereby the temperature of the catalyst bed is rapidly raised. In this case, the catalyst bed may catch fire. However, when the ratio of C to Z is low, such shortcoming can be avoided. In other words, when zeolite is added to activated carbon, the inflammable point of the activated carbon becomes higher.

The steps for producing the decomposition catalyst are now explained in detail.

Powdery or particulate activated carbon and zeolite are wet-blended in the presence of one or more binders. The blending may be molded into the shape of a tablet pellet or particle. The molded shape is dried at such a temperature that the property of activated carbon is not changed, thereby removing most of the water from the molded shape. Preferably, the temperature is in the range of from 100° C. to 110° C. In the drying step, it is desirable to dry the molded shape, until the moisture content of the molded shape is minimum, because moisture in the molded shape has a bad effect of the calcining step.

The dried molded shape is calcined at a temperature at which the network structure of the zeolite is not broken. The temperature is in the range of from 170° C. to a temperature at which network structure of zeolite is not broken. Preferably, the temperature is in the range of from 350° C. to a temperature at which network structure of zeolite is not broken. The atmosphere in which the calcination is carried out is air, or an inert gas, such as argon or nitrogen. When the calcination is effected in air, the activated carbon tends to be consumed through the reaction of the carbon and oxygen as the temperature is raised. Therefore, the calcination may be preferably effected in an inert gas to prevent consumption of the activated carbon. However, if the calcination is effected in air at a relatively low temperature, the consumption of activated carbon can be ignored. So, it is not critical to effect the calcination in an inert gas.

When the calcination is effected at a temperature of less than 170° C., a calcined product having sufficient strength can not be obtained even though calcination is carried out for a long time. When the decomposition catalyst is used as an adsorption bed, it should have sufficient strength and activity.

The upper limit of the temperature at which the calcination is effected should be the temperature at which the network structure of the zeolite is broken. If the activated carbon-zeolite mixture is calcined above said upper limit, a porous product can not be obtained. Instead the mixture is converted to amorphous or non-zeolite material, and such amorphous or non-zeolite material does not have a porous structure and has a low specific surface and, because of this does not have high ozone-decomposing ability. The temperature at which the network structure of zeolite is broken depends on the kind of the zeolite. For example, part of the structure of A-type zeolite is broken by heat treatment at 650° C., and about 50% of the network structure of A-type zeolite is broken within the temperature range of 750° C.–800° C. Part of the structure of X-type zeolite is broken within the temperature range of 660° C.–700° C., and about 50% of X-type zeolite structure is broken within a temperature range of 750° C.–800° C. Part of the Y-type zeolite structure is broken within the temperature range of 700° C.–800° C. The temperature at which the zeolite structure breaks down is also affected by the kind of substituted metal ions on the zeolite. Mordenite and faujasite are stable at 600° C. Clinoptilolite is stable within a temperature range of 700° C. to 750° C.

Water in the molded shape has a bad effect on the depletion of structure. For example, the presence of water in the molded shape before calcination lowers the temperature at which breakdown of the zeolite structure occurs. When the calcination is effected in an inert gas, the calcination time can be shortened and a decomposition catalyst having great mechanical strength can be obtained. When calcination is effected under conditions as mentioned above, loss of the activated carbon becomes minimum.

A process for treating an ozone-containing gas using the decomposition catalyst is now explained hereinunder.

Figure 2:
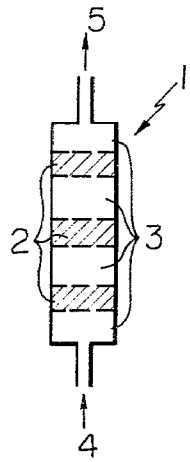
Figure 3:
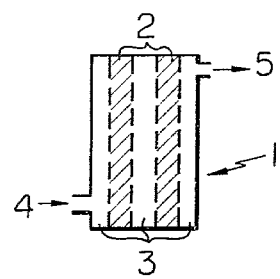

In case of treating a dry gas, the gas is passed at a siuitable flow velocity through a bed composed of the decomposition catalyst (refer to FIGS. 1 to 3).

In FIGS. 1 to 3, 1 is adsorption column, 2 is decomposition catalyst bed and 3 is a gas phase present between the decomposition catalyst beds, 4 is inlet for an ozone-containing gas and 5 is exit for the treated gas. For example, decomposition catalyst having average diameter in the range of 1/16 to ⅛ inch may be charged into the adsorption column. An ozone-containing gas may be passed through the column with a space velocity within the range of 2,000 to 20,000/hr. In this case, with several seconds contact ozone concentration of 800 to 3,000 ppm can be lowered to value less than 0.1 ppm.

In addition, an ozone-containing gas having relative humidity of 100% can be treated with the decomposition catalyst. Even in this case, the life of the decomposition catalyst is long. In case of treating a gas having such high humidity, it is unnecessary to lower the dew point of the gas by passing the gas through drier before contacting the gas with the decomposition catalyst. This is economical.

The decomposition catalyst produced according to the present invention is usable for treating a dry ozone-containing gas as well as an ozone-containing gas having high moisture content.

So, the decomposition catalyst is suitable for treating the wet ozone-containing gas generated by tertiary treatment of waste liquor.

In case of treating an ozone-containing gas with droplets, it is preferred to previously remove the droplets from the gas by passing the gas through a vapor-liquid separator, thereby preventing rapid deterioration in catalyst activity.

The invention is further illustrated, but in no way limited by the following Examples. The percent and parts are by weight, unless otherwise specified.

EXAMPLE 1

Calcined activated carbon-zeolite molded shapes (decomposition catalyst) were prepared using 205 Kg of natural mordenite (powder of less than 10 Mesh), 30 Kg of bentonite (powder of less than 200 Mesh) and 240 Kg of activated carbon (finely divided powder obtained from palm husk and having a specific surface of about 1,300 m²/gr. pore volume of 1.1 cm³/gr. and inflammable point of 310° C.) which were blended completely. Aqueous sugar solution (containing 25 Kg of sugar) was added to the resulting mixture, followed by wet-blending for four and half hours. The resulting blending was molded in pellets of 1/16 to ⅛ inch average diameter by using molding means. The resulting molding was dried within the temperature range of 100° C.–110° C. by using a drier. The dry molded shape were divided into several lots. Each lot was calcined under conditions as given in Table 1.

TABLE 1

| Experiment No. | Size of catalyst (inch) | Hardness* Kg/pellet | Calcination | Atmosphere |
|---|---|---|---|---|
| 1 | ⅛ | 3.92 | No | |
| 2 | ⅛ | 5.02 | Yes | Air (360° C.; 3 hrs) |

TABLE 1-continued

| Experiment No. | Size of catalyst (inch) | Hardness* Kg/pellet | Calcination | Atmosphere |
|---|---|---|---|---|
| 3 | ⅛ | 7.69 | Yes | N₂ (500° C.; 2 hrs) |
| 4 | 1/16 | 1.24 | No | |
| 5 | 1/16 | 2.56 | Yes | N₂ (500° C.; 2 hrs) |

*Hardness = scale as measured by Kiyashiki Hardmeter.

A high hardness value means high mechanical strength.

It is clear from Table 1 that the calcined sample is superior to the non-calcined sample in respect of the hardness. Also calcination in an inert gas gives results superior to those obtained by calcination in air. In Experiment 2, since calcination is effected in air, loss of activated carbon is detected, whereas in Experiment 3, in which calcination is effected in an inert gas, little activated carbon is lost in spite of the high calcination temperature. In Experiment 3, the carbon content of the calcined product was 47.89%. This value approximates that in raw material. In Experiment 5, carbon content in the calcined product was 47.63%. This means that calcination in an inert gas does not cause loss of carbon, even when the calcination temperature is higher than the inflammable point.

EXAMPLE 2

A decomposition catalyst was prepared from 20 parts of A-type zeolite (powder below 200 Mesh; Na substitution), 75 parts of activated carbon employed in Example 1 and 3 parts of bentonite (powder less that 150 Mesh) which were blended completely to form a mixture. Aqueous sugar solution (containing 2 parts of sugar) was added to the mixture. The resulting mixture was wet-blended for 9 hours by using blending means. The resulting blending was molded into ⅛ inch pellets as in Example 1. The pellets were dried as in Example 1. The pellets were divided into several lots. Each lot was calcined under conditions as given in Table 2.

TABLE 2

| Example No. | Size of catalyst (inch) | Hardness (Kg/pellet) | Atmosphere |
|---|---|---|---|
| 6 | ⅛ | 2.74 | air (370° C.; 3 hrs) |
| 7 | ⅛ | 4.97 | N₂ (540° C.; 2 hrs) |

It is clear from Table 2 that calcination in an inert gas gives results superior to those obtained in air in respect of hardness.

EXAMPLE 3

The decomposition catalyst was prepared as in Example 1.

The calcination conditions, component constituting the catalyst and carbon content of the resulting catalyst are given in Table 3.

TABLE 3

| Decomposition catalyst | Zeolite | Activated carbon | Binder | Average diameter and shape of molding | Calcination condition | C content in catalyst (%) |
|---|---|---|---|---|---|---|
| ZC-A | Commercial name "Zeoharb ZE505" (mordenite type zeolite) | product from palm husk (specific surface 1300 m²/gr; pore volume 1.1 cm³/gr) | bentonite (5%) and sugar (5%) | ⅛" pellet | N₂ 450° C. 3 hrs. | 51.96 |

TABLE 3-continued

| Decomposition catalyst | Zeolite | Activated carbon | Binder | Average diameter and shape of molding | Calcination condition | C content in catalyst (%) |
|---|---|---|---|---|---|---|
| ZC-B | Commercial name "Zeoharb ZE505" (mordenite type zeolite) | product from palm husk (specific surface 1300 m²/gr; pore volume 1.1 cm³/gr) | bentonite (5%) and sugar (5%) | 1/16" pellet | $N_2$ 450° C. 3 hrs. | 51.90 |
| ZC-C | Commercial name "Zeoharb ZE025" (natural zeolite) | product from palm husk (specific surface 1300 m²/gr; pore volume 1.1 cm³/gr) | bentonite (5%) and sugar (5%) | 1/16" pellet | $N_2$ 450° C. 2 hrs. | 53.42 |
| ZC-D | Zeoharb ZE505 | product from palm husk (specific surface 1300 m²gr; pore volume 1.1 cm³/gr) | bentonite (5%) and sugar (5%) | 1/16" pellet | $N_2$ 450° C. 3 hrs. | 47.92 |
| ZC-E | Commercially available X-type zeolite | product from palm husk (specific surface 1300 m²/gr; pore volume 1.1 cm³/gr) | bentonite (5%) and sugar (5%) | ⅛" pellet | $N_2$ 450° C. 3 hrs. | 51.58 |

Zeoharb is trade name of zeolite sold by Osaka Oxygen Industries Ltd.

Figure 4:
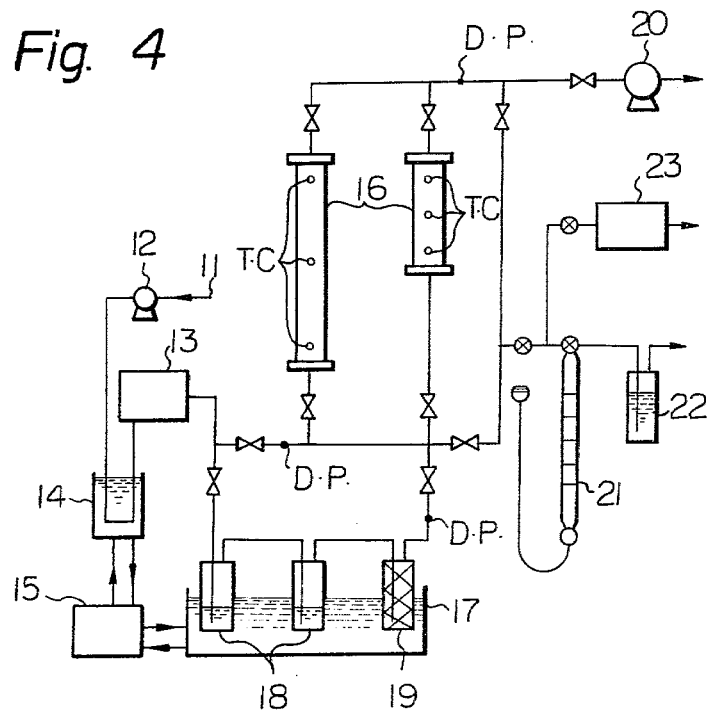
FIG. 4 shows the flow sheet of an apparatus for treating an ozone-containing gas.

An ozone-containing gas was treated using the apparatus as illustrated in FIG. 4 in the following. Air was fed into constant temperature bath 14 via compressor 12 and line 11. Air having constant temperature is continuously fed from the bath to ozonizer 13. Part of the oxygen in air is converted to ozone. The ozone-containing air is fed into adsorption column 16 at a constant flow velocity. The column is equipped with thermocouple (T.C.).

On the other hand, in case of treating wet gas, the ozone-containing air (dry state) from ozonizer is fed into moisture saturator 18, and droplets in the gas are removed in drain separator 19. Thereafter, the gas is fed into adsorption column 16. The gas discharged from column 16 is charged into atmosphere via flow meter 20. Part of the gas to be fed into column 16 and part of the gas discharged from column 16 may be fed into means 23 for measuring ozone concentration (Dasili-ultraviolet adsorption method) or ozone titrating means 11 and 12. D.P. expresses dew point-measuring means.

A heat-generator 15 supplies liquid at proper temperature to the constant temperature bath 14 and/or to a constant temperature bath 17 for the moisture saturator 18 and drain separator 19. A suitable ozone-titration system 21, 22 may also be provided.

Ozone-containing air (ozone content: 2400 ppm–2800 ppm) was treated using the above catalyst.

The catalyst layer employed: 22 mm (inner diameter)×50 mm (height)

Amount of catalyst employed: 9.5 gr.

Gas to be treated: wet and dry ozone-containing air

TABLE 4

| Test No. | Catalyst | Gas to be treated | Flow velocity (l/min.) | Number of hours passed until catalyst comes up to break-through point |
|---|---|---|---|---|
| 1 | ZC-D | dry ozone-containing air (ozone content: 2480 ppm) | 1.28 | 14 hours and 50 minutes |
| 2 | ZC-C | dry ozone-containing air (ozone content: 2580 ppm) | 1.10 | 16 hours and half |
| 3 | ZC-D | wet ozone-containing air (relative humidity: 100% ozone content: 2530 ppm) | 1.03 | 29 hours and 20 minutes |
| 4 | ZC-A | wet ozone-containing air (relative humidity: 100 % ozone content: 2220 ppm) | 1.03 | 18 hours and 40 minutes |
| 5 | ZC-E | dry ozone-containing air (ozone content: 2790 ppm) | 1.06 | 9 hours and 20 minutes |
| Control 1 | Commercially Available Ozone Decomposing Agent I* | dry ozone-containing air (ozone content: 2400 ppm) | 1.00 | The catalyst came up to break-through point after 15 seconds. When 3 minutes passed, ozone content in the treated air was 390 ppm |

*Ozone-Decomposition Agent sold by Shinagawa Hakurenga Co. comprising activated carbon and gel composed of silica and alumina It is clear from Table 4 that the present decomposing catalysts give results superior to those obtained by the prior ozone decomposing agent in respect of breakthrough point.

EXAMPLE 4

An ozone-containing gas (ozone content: 800 ppm) was treated to make it innoxious as in Example 3. The catalysts employed was ZC-C and ZC-B produced in Example 3. The size of the catalyst was 1/16 inch. Commercially available ozone decomposing agent II was composed of only activated carbon.

The treating conditions were as follows:

Catalyst layer: 22 mm (inner diameter)×225 mm (height)

Gas to be treated: dry and wet ozone-containing gas
Flow velocity of gas: 7.5 liter/minute

TABLE 5

| Test No. | Catalyst | Gas to be treated | Amount of catalyst employed (gr.) | Number of hours passed until catalyst comes up to breakthrough point |
|---|---|---|---|---|
| 6 | ZC-A | wet ozone-containing air (relative humidity: 100%) | 46 | 50 hours and 50 minutes |
| 7 | ZC-C | wet ozone-containing air (relative humidity: 100%) | 46.7 | 60 hours |
| 8 | ZC-B | wet ozone-containing air (relative humidity: 100%) | 50.8 | 69 hours and 30 minutes |
| Control 2 | activated carbon | wet ozone-containing air (relative humidity: 100%) | 45 | 10 hours |
| Control 3 | activated carbon | dry ozone-containing air | 45 | about 10 hours |
| Control 4 | Ozone-decomposing agent employed in Control 1 | dry ozone-containing air | 59 | within 10 seconds |
| Control 5 | Ozone-decomposing agent employed in Control 1 | wet ozone-containing air (relative humidity: 100%) | 59 | within 10 seconds |

It is clear from Table 5 that the decomposition catalyst produced according to the present invention give results superior to those obtained with the prior catalyst composed of only activated carbon.

EXAMPLE 5

A gas having low ozone content, for example, ozone content of 100 ppm was treated in this example. The zeolite constituting the decomposition catalyst was natural clinoptilolite sold by Anaconda Co. X-ray diffraction of the clinoptilolite is shown in Table 6.

TABLE 6

| d(A) | I/I$_o$ | d(A) | I/I$_o$ |
|---|---|---|---|
| 8.96 | 100 | 3.72 | 4 |
| 7.96 | 27 | 3.56 | 10 |
| 6.78 | 10 | 3.46 | 7 |
| 5.61 | 1 | 3.42 | 25 |
| 5.14 | 24 | 3.32 | 7 |
| 4.66 | 15 | 3.17 | 22 |
| 4.35 | 4 | 3.12 | 10 |
| 3.97 | 33 | 3.07 | 9 |
| 3.91 | 34 | 2.97 | 70 | d = lattice spacing (unit A)
I/I$_o$ = relative strength

The activated carbon employed in this example was the same as that employed in Example 1. The decomposition catalyst was prepared in the same way as in Example 1 except that molded shape of ⅛ inch average diameter were calcined in a nitrogen gas at 720° C. for 2 and half hours.

An ozone-containing air was treated using the decomposition catalyst.

Figure 5:
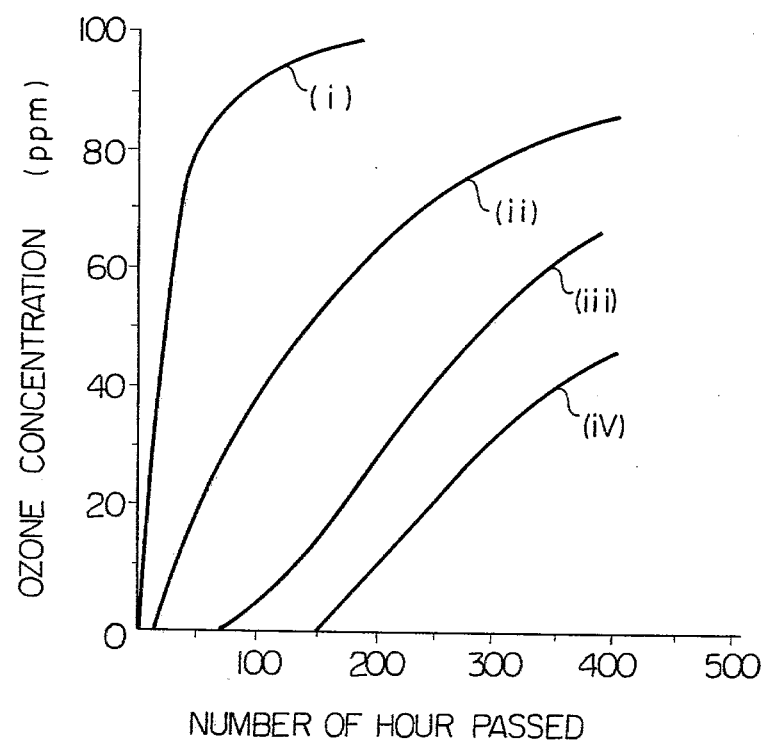
FIG. 5 is a graph showing the relationship between ozone concentration and number of hours passed.

Treatment conditions:
Decomposition catalyst: ⅛ inch pellet; 40 gr. (clinoptilolite-activated carbon; carbon content=54.7%)
Catalyst bed: 22 mm (inner diameter)×225 mm (height)
Gas to be treated: dry ozone-containing air (O$_3$=100 ppm)
Flow velocity: 7.5 liter/minute The treatment was effected by using the apparatus as illustrated in FIG. 4. The air to be treated was sent directly into the catalyst column without passing it through a constant temperature bath. The test results are shown in FIG. 5. Curved lines (i), (ii) and (iii) show the relationship between the number of hours passed and ozone concentration of the gas from outlets for gas at distance of 56 mm, 113 mm and 170 mm from the bottom of the column, respectively. Curved line (iv) shows break-through curve of ozone in the catalyst bed. In this example, break-through in the catalyst was detected after the gas have been passed through the catalyst bed for 168 hours. This means that the decomposition catalyst produced according to the present invention is very effective for decomposing ozone.

The inflammable point of the activated carbon and zeolite becomes higher, as the ratio of activated carbon to zeolite increases. For example, in case of the calcined molded shape composed of activated carbon (obtained from a palm husk) and mordenite, the relationship between the inflammable point of the molding and the amount of mordenite employed is as follows:

| percent of mordenite on the basis of the weight of molding | inflammable point (°C.) |
|---|---|
| 87.65 | 530 |
| 43.58 | 440 |
| 0 | 310 |

What is claimed is:

1. A process for removing ozone from an ozone-containing gas which comprises treating the gas with a calcined molded product composed of activated carbon-zeolite mixture, the ratio of the activated carbon to the zeolite being in the range of from 0.2 to 9.0, obtained by effecting the steps of
    (a) wet-blending powdery or particulate activated carbon and zeolite in the presence of an organic binder and/or an inorganic binder,
    (b) molding the resulting blend,
    (c) drying the molding, and
    (d) calcining the molding at a temperature in the range of from 170° C. to a temperature at which network structure of zeolite is not broken.

2. The process as defined in claim 1 wherein the calcination is carried out in an inert gas atmosphere.

3. The process as defined in claim 1 wherein the calcination is carried out at a temperature in the range of from 350° C. to a temperature at which network structure of zeolite is not broken.

4. The process as defined in claim 1 wherein the zeolite is selected from the group consisting of mordenite, clinoptilolite, X-type zeolite, Y-type zeolite, A-type zeolite and mixtures thereof.

5. The process as defined in claim 1 wherein the ozone-containing gas is in a dry state.

6. The process as defined in claim 1 wherein the ozone-containing gas is a wet state.

* * * * *